United States Patent [19]

Henke

[11] 4,267,664

[45] May 19, 1981

[54] PROCESS FOR CULTIVATION OF MUSHROOMS AND MUSHROOM NURSING PLANT FOR CARRYING OUT THE PROCESS AND AIR CONDITIONING PLANT FOR THE MUSHROOM NURSING PLANT

[76] Inventor: Detlef Henke, Fabeckstr. 57, 1000 Berlin 33, Fed. Rep. of Germany

[21] Appl. No.: 911,216

[22] Filed: May 31, 1978

[30] Foreign Application Priority Data

Jun. 8, 1977 [DE] Fed. Rep. of Germany ....... 2726176
Sep. 30, 1977 [DE] Fed. Rep. of Germany ....... 2744684

[51] Int. Cl.³ .............................................. A01G 1/04
[52] U.S. Cl. ......................................... 47/1.1; 47/18
[58] Field of Search ........................... 47/1.1, 18; 71/5

[56] References Cited

U.S. PATENT DOCUMENTS

| | | | |
|---|---|---|---|
| 1,694,482 | 12/1928 | Morris | 47/1.1 |
| 2,097,766 | 11/1937 | Knaust | 47/1.1 |
| 2,723,493 | 11/1955 | Stoller | 47/1.1 |
| 3,810,327 | 5/1974 | Giansante | 47/1.1 |
| 3,896,941 | 7/1975 | Kuhn et al. | 47/1.1 X |
| 4,001,966 | 1/1977 | Metzner | 47/1.1 |

FOREIGN PATENT DOCUMENTS

| | | | |
|---|---|---|---|
| 731778 | 1/1943 | Fed. Rep. of Germany | 47/1.1 |
| 513124 | 2/1955 | Italy | 47/18 |
| 203356 | 6/1939 | Switzerland | 47/1.1 |

*Primary Examiner*—Robert E. Bagwill
*Attorney, Agent, or Firm*—Max Fogiel

[57] ABSTRACT

This application relates to an improved system for aerating mushroom cultivating chambers.

9 Claims, 6 Drawing Figures

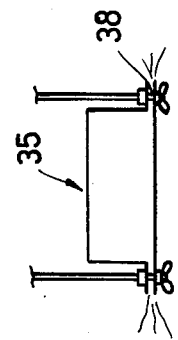
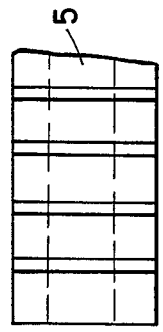
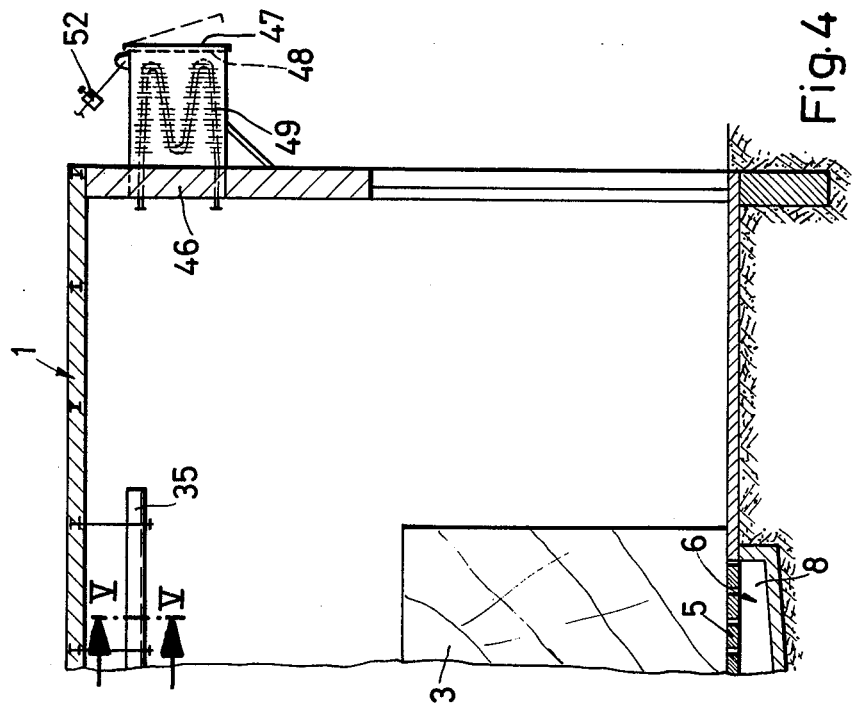

PROCESS FOR CULTIVATION OF MUSHROOMS AND MUSHROOM NURSING PLANT FOR CARRYING OUT THE PROCESS AND AIR CONDITIONING PLANT FOR THE MUSHROOM NURSING PLANT

BACKGROUND OF THE INVENTION

Mass pasteurization of nutrient compost is known which is treated in large masses within a climatized tunnel during the first three phases of cultivation of a cultivation cycle and which is packed into containers after completion of a third phase in order to be taken to the place of application for brood growth till harvest. Mass pasteurization has the disadvantage that there is necessary an expensive intermediate transport of nutrient compost.

Above, the fourth phase of the cultivation cycle of mushrooms happens regularly in boxes being stacked one upon the other in racks. The nutrient compost quantity being in the boxes has a relatively small thickness so that during the mushroom harvest the nutrient substances of the nutrient substrate will be consumed essentially already after the second wave and there will follow further waves which supply only minor outputs.

SUMMARY OF THE INVENTION

The invention is, therefore, based on the object to create a process for cultivation of mushrooms and a mushroom nursing plant in order to carry out this process and an air conditioning plant for the mushroom nursing plant, in order to achieve large outputs to each area unit at a minor transport expense for the nutrient compost.

The solution of this problem results from the condition that it is possible that all phases of one mushroom cultivation cycle may be carried out at one place where not any intermediate transport of nutrient compost or nutrient substrate is required. Furthermore, based on the cross-section of the nutrient compost hilly bed according to the invention, there is achieved that during harvest phase there will grow 4 to 6 or even more waves of equivalent strength as nutrient substances are always supplied to the mushrooms from the depth of the nutrient substance track which is 1 to 1.2 m thick during the harvest phase. Also, it has been proven that mushrooms which were produced with the process according to the invention grow very quickly large and compact and contain mush aroma. The color of the mushrooms is snow-white. Furthermore, no diseases were found within the harvest phase of several weeks, i.e. of eight to ten weeks. This depends from the fact that, caused by the dimensions of the nutrient compost hilly bed according to the invention, and by using the transverse air slits of the pertinent air duct, during the harvest phase, considerable quantities of carbon dioxide provided from the nutrient substrate are pressed upward by the air current and escape on the covering earth layer, where the carbon dioxide passes by the fruit-bodies (mushrooms) and thus causes a disinfectant effect on the mushroom themselves. With this, diseases, such as bacterial spots or verticillium species, will even not develop. Depending from this disinfectant effect and the possibility to supply nutrient substances continually from the depth of the nutrient substrate, it is possible to produce at least 4 to 6 or more waves of mushrooms of a large output if using the process relative to the invention from the nutrient compost or nutrient substrate track.

With the process of cultivating mushrooms according to the invention, production of nutrient compost, its pasteurization and conditioning and the brood or mycel development as well as the harvest take place in one place. By this, working proceedings are rationalized so that it is possible to save energy up to 80% compared against conventional procedures and to save workers, as their manual labor during the harvest can be increased by at least 50% by the optimal picking height of 1-1.2 m. The cultivation cycle may be reduced by at least one week. Any cultivation boxes and transport facilities as having been required hitherto are no longer required for the cultivation of mushrooms, and thus, considerable savings of costs can be achieved by minor equipment costs.

The mushroom nursing plant used to carry out the cultivation process of mushrooms according to the invention is characterized by the same advantages as stated above.

The air conditioning plant according to the invention for the mushroom nursing plant serves for exact setting of temperature, oxide and air-moisture within the hilly bed and around it during the various phases of development of the mushroom culture. The air conditioning plant relative to the invention is economical in consumption of energy, particularly with the object of energy recovery, i.e. both heat and cooling energy.

BRIEF DESCRIPTION OF THE DRAWINGS

In the following, the invention is explained more detailed by a mushroom nursery plant shown by drawings with the pertinent air conditioning plant.

FIG. 4 is a continuation of the section in accordance with FIG. 3 on the other end of the enclosure, FIG. 5 shows a detail of the supply air shaft for the room inside air in accordance with line V—V of FIG. 4 through a distributor, and FIG. 6 shows a site of a part of the covering grill of the air-ducts.

DESCRIPTION OF THE PREFERRED EMBODIMENTS

Figure 1:
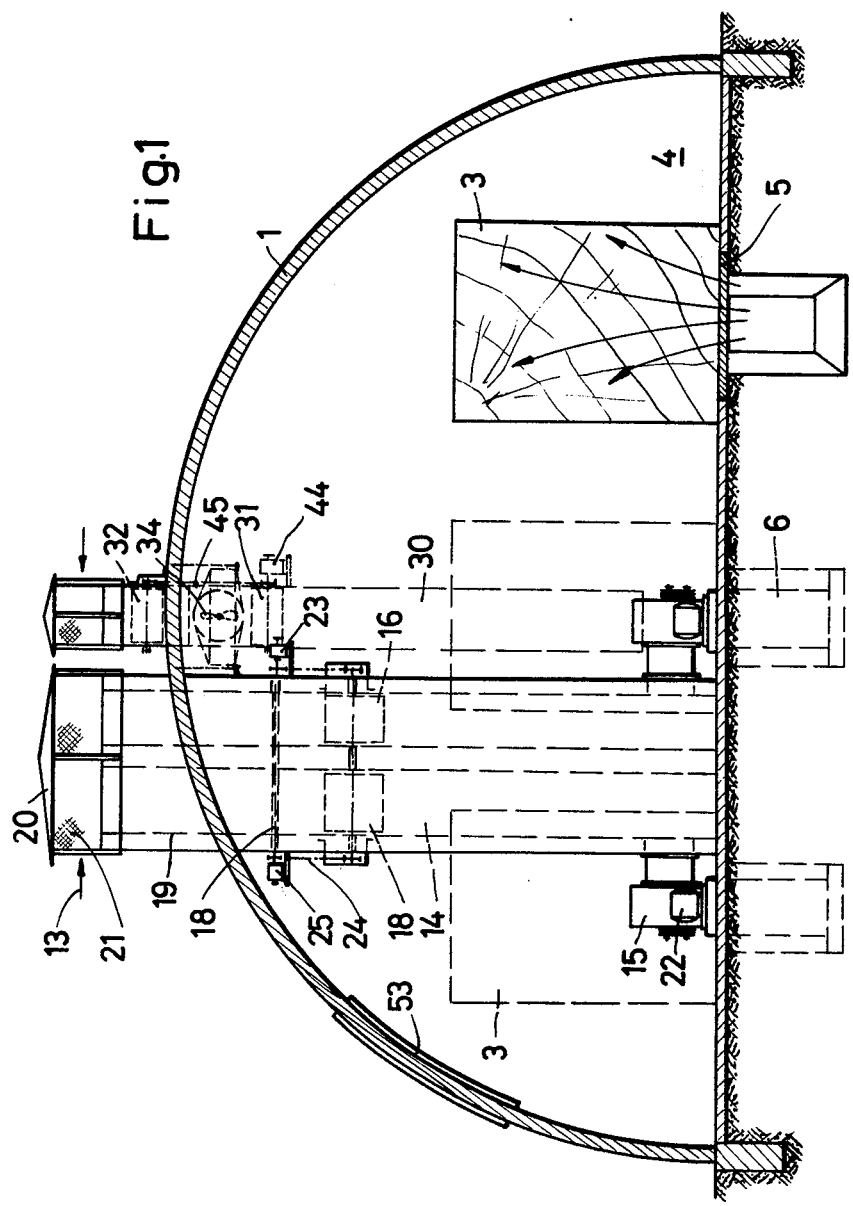
FIG. 1 is a section taken along line I—I in FIG. 2 through an enclosure for a mushroom nursing plant of three hilly beds.

A hall or enclosure 1, with a cross-section almost semicircular and provided on the north side with windows 53, has a basical width of approx. 11 m, a length of approx. 44 m and a medium height of approx. 5.50 m total. It covers a climatized culture room 2 and an engine room 4. In culture room 2, there are stacked parallel to each other and with a distance to each other three hilly beds 3 containing mushroom cultures to be climatized. The sectional dimensions of the hilly beds 3 are approx. 2×2 m at the beginning of the cultivation cycle. Conventional material will be used as nutrient compost for the hilly beds 3.

Essentially covering the total length, in the area of culture room 2 under each hilly bed 3, there extends an air-duct 6 provided with covering grills 5 from steel concrete ply-bottom plates. These have cross-section of decreasing wedge shaped or bevel shaped, so that the dynamic pressure generated by a radial fan 15 is distributed evenly (dynamic pressure 80-120 mm water column at an air capacity of 100-200 cbm/air per ton of compost). The width of the air-duct 6 covers approx. 30% of the width of the hilly bed 3, i.e. with a width of approx. 2 m of the hilly bed the clearance of the air-duct 6 will be approx. 40-70 cm, and preferably 60 cm. The deepest point is arranged at a proportion 1:2 up to 1:2.5 (width by depth). The depth is determined by way of calculation from the optimal air-speed being possibly constant for air-duct 6, i.e., between 6-10 m/sec. The covering grills 5 have air-slits of about 10-20 mm in width and are arranged vertically to the air direction. The air-duct is protected against cooling by a layer of styrofoam of a thickness of 3-5 cm or by a coarse-grained clinker serving as heat insulation. The deepest point of the air-duct 6 is connected to the waste water drainage through an U-bend 9. The U-bend should work with an air over-pressure of 300 mm water column so that no loss of air is developed. The air-duct 6, and therefore, also the U-bend 9 are accessible to supervision and cleaning by a control cover 9. In the air-duct 6 there is arranged in the area between air intake end and the first covering grill 5, a heating and cooling facility for heating or cooling the sub-air of the hilly bed. Furthermore, water-jets 11 and a steam-jet 12 as air humidifier, cooling and warming facilities, and a device for washing the air for the subairing of the hilly beds, run into the air-duct within this area. Equipments in the form of heating or cooling equipment 10, water nozzles 11, and steam nozzle 12 are connected to generating sets through mains which are not shown in detail.

Figure 2:
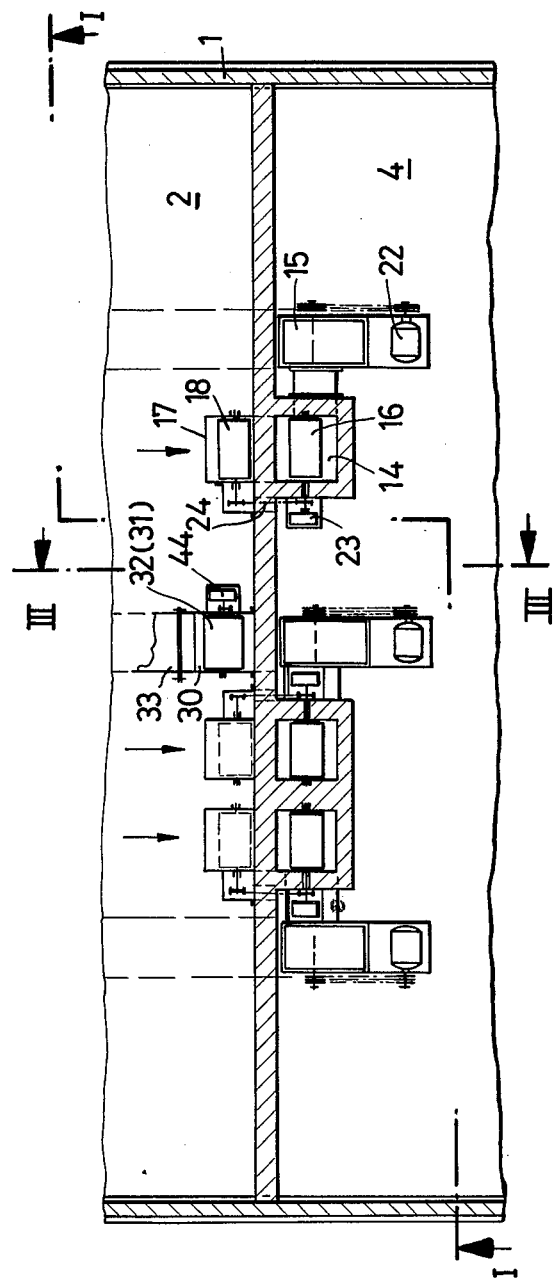
FIG. 2 is a horizontal partial section through the enclosure in the vicinity of feed air shafts of the air conditioning plant for the mushroom nursing plant.
Figure 3:
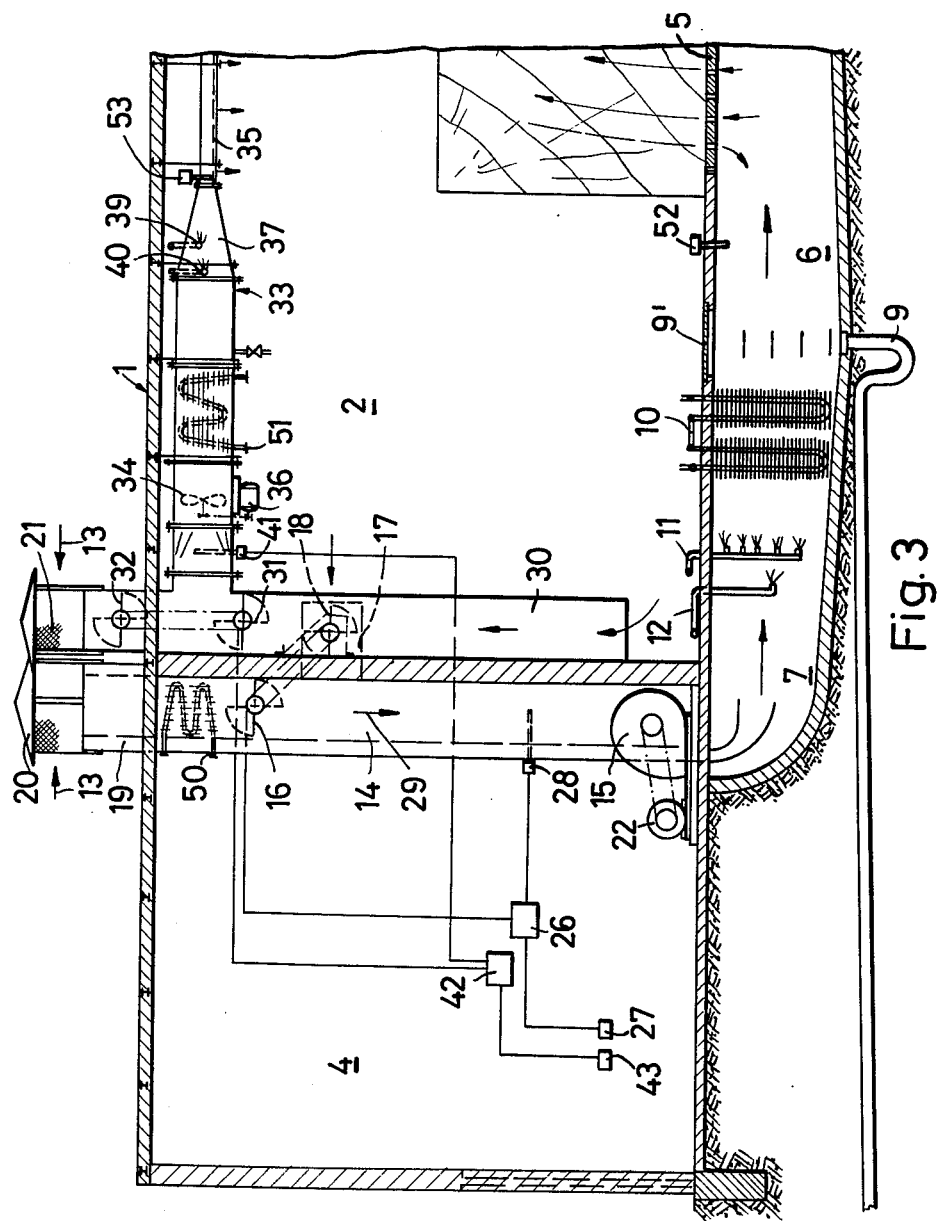
FIG. 3 is a section taken along line III—III in FIG. 2.

Into the area of the air feeding end 7 of each air-duct 6, there runs a supply air shaft 14 connected with the outside air (arrow 13). A radial fan 15 and a control damper 16 are installed in it, and a circulation air vent 17 leads into culture room 2 runs into it. In the latter is installed a circulation air damper 18 connected by a gearing with the control damper 16. As shown particularly by FIG. 2, the feeding air shaft 14 consists of a chimney laid by bricks projecting just through the external hide of hall or enclosure 1, the cross-section of which is approx. 600×600 mm. The chimney 19 arranged within the engine room 4 is protected against atmospheric effects from above by a roof 20. There is provided a wire-screen 21 from galvanized steel wire or from nylon to mantle the intake-hole of the air-duct 14 in order to avoid any taking-in of strange particles, such as, e.g., insects and the like.

The radial fan arranged in the engine room 4, is operated by a driving motor 22 through a belt drive. Radial fan 15, driving motor 22, and belt drive are outside of the feeding air shaft 14.

The control damper 16 operated by a motor 23 is connected with the circulation air damper 18 through a chain drive.

The radial fan 15 takes in fresh air through the feeding air duct 14 (arrow 13) through the wire-screen 21, and presses it into the air-duct 6 at a working pressure difference of approx. 100 mm water column, through the compost or substrate track of the respective hilly bed 3 and thus is instrumental in the conditioning or climatization process. The radial fan 15 has a capacity of 150 up to 200 cbm/h air per ton of compost or substrate of the hilly bed 3.

From the radial fan 15, fresh air, circulation air or air mixed to a particular rate can be taken in and blown into the hilly bed 3. With the control damper 16 open, the circulation air damper 18, connected with the first by gearing, is closed, so that in this case only fresh air (arrow 13) can be taken in. With the control damper 16 closed, the circulation air damper 18, connected with the first by gearing, is open, so that only circulation air from culture room 2 can be taken in and blown into the substrate track of hilly bed 3. With proportionate intermediate settings, mixtures from fresh air and circulation air are possible. On the pressure side of the radial fan 15, on the air supply end 7 of the air-duct 6, there are guide plates for better air conduction. Here, the air current cross-section widens, and the air must alter its direction at approx. 90°. Therefore, the duct cross-section is provided with a large radius of, e.g., 1000 mm.

The control damper 16 and the circulation air damper 18 are pivoted in ball or slide bearings, and connected by the chain drive provided with a roll chain over two equal gears. The driving motor, 23 as setting motor is connected directly with control damper 16, and it operates the circulation damper 18 through the roll chain. The setting motor is controlled automatically in accordance with a nominal value/actual value control. For this, a control gear 26 is connected with each one, the setting motor 23, a nominal value transmitter 27, and a temperature and moisture sensor 28 which projects into the feeding air shaft 14. The current direction of the air in the air shaft 14 flows always in equal direction with the arrow 29.

In addition to the feeding air shafts 14 belonging to each hilly bed 3 and arranged within engine room 4, there is provided an air shaft 30 within the culture room 2, which is connected with the room air, and the outside air and between two control dampers connected by units 31, 32 with a feeding air shaft 33 for room inside air. The shaft extends in the upper area of culture room 2 over essentially the whole length of the hilly beds 3, and is provided with at least one fan 34 and with air distributors. The air shaft 30 is fixed to the partition between culture room 2 and engine room 4 and is provided with an intake vent for the room air over the bottom of culture room 2. The air shaft 30 is a sheet metal duct of square shaped section with a cross-section of approx. 600×600 cm. The feeding air duct 33, which is in the culture room 2, is essentially arranged under the ceiling of hall 1. The fan 34 driven by a motor 36 is an axial fan and has a capacity of 100 to 150 cbm/h air per ton substrate at a pressure difference of approx. 20 mm water column. In the feed air shaft 33 there is installed, but not explained precisely, a facility for washing the air in order to be effective in the range of virus control. Thus, spores and dust particles can be washed off from the fresh air, mixed air and circulating air. The cross-section of the feed air shaft 33 is reduced by a reducing piece 37. The linking up air distributor 35 extending over the total length of the hilly beds 3 has, coming from a width of 1.0 to 1.2 m, on the end, merely a width of 0.15 m. The air enters from the air distributor 35 through adjustable slits 38 into the culture room 2. The cross-section of the slits can be adjusted by shifting butterfly nuts. It is essential to have the same slit width all over the length of the wedge-shaped air distributor 35.

In the reducing piece 37 there are provided water spraying and steam jets for the purpose of air conditioning.

A temperature and air moisture sensor 41 in the feed air shaft 33, is connected with a control unit 42 which, on the other hand, is connected with a nominal value transmitter in order to influence by a setting motor 44, the position of the control dampers 31, 32. The control dampers 31, 32 are connected through a roll chain 45. The control unit 42 evaluates the temperature determined on the sensor 41 in comparison with the setting of the control dampers 31, 32 and the selected nominal value, and then operates the setting motor 44 of the control dampers 31, 32 proportional to the nominal value. Water jets 39 serve for moistening, particularly during the summer period. In the other case, particularly in winter, when heat is required, moistening will take place by steam through the steam jets 40. These jets serve for sharp adjustment.

Additional temperature sensors 52, 53 are arranged in the air duct 6 or in the air shaft 33 in order to monitor the adjusted nominal values for temperature and air dampness.

On the end of hall or enclosure 1 opposite to the engine room 4, there is provided a room air exhaust vent which is lockable by a damper 47 and protected against the entering of foreign particles, particularly insects, by a wire screen 48. Within the room air exhaust vent 46 and within the feed air shafts 14, 33, there are arranged heat exchangers which are connected mutually for heat recovery in a way that is not specified. Heat or cold contained in air, that escapes through the room air exhaust vent, can e.g., be recovered and fed into the heat exchangers 50 51, in order to heat or to cool the entering fresh air. On the other hand, with several halls or enclosures 1 arranged side by side and installed correspondingly, the heat of one hall, where the mushroom cultures are in the conditioning phase at approx. 60°, can be recovered and fed into another hall where the mushroom cultures are in another phase and at other temperatures. Analogous to this, cold can be recovered and fed into another hall. Recovery of heat or cold could take place by means of a liquid, e.g. water, conducted through insulated pipelines. The heat exchangers 49, 50, 51 can be switched on automatically in multi-stage switching as a basic load of the heating or cooling. If the requirement of heat or cold cannot be covered, additional energy will be used. The control can also take place by manual operation.

The damper 47, arranged to the room air exhaust vent, provided with a relief weight 52, which opens by means of air super-pressure in culture room 2, i.e. when fresh air is added, can also be provided with a switch which generates an impulse for switching on or off the heat recovery system.

The two dampers 31, 32 in the air shaft 30 are connected in a manner where the damper 32 is open when the damper 31 is closed, so that through the feed air shaft 33 only fresh air can be taken in. When the damper 32 is closed the damper 31 is open, so that through the feed air shaft only circulation air can be taken in. With the dampers 31, 32 half open, a mixture of fresh air and circulation air is taken in through the feed air shaft.

The principle of the related air washing is based on atomizing water by a large number of suitable jets within the area of the air ducts through which air is conducted. The air washing is very important in order to control definitely any kind of infections of the mushroom culture. It is of importance in winter as well as in summer, i.e. either cold or warm water should be used.

The process of cultivating mushrooms is described below in detail by the mushroom nursing plant with air conditioning plant shown by the figures, and also mentioned above.

The airing of the nutrient compost beds, which can take place either from below by blowing through the air or from outside by extracting the air, and the climatization of the room 2, form a combined system for room and underfloor duct airing and ventilation, that makes possible the process of cultivation of mushrooms within the long extended nutrient compost hilly beds. Each nutrient compost hilly bed 3 will in the beginning of a cultivation cycle be stacked up over an air-duct 6 with a width and a height of about 2×2 m and a length of approx. 30 m, while approx. 5 m of distance will be left near the ends of the hall 1. During phase 1, watering and airing the compost should take place. By the controlled supply of tempered air through the air duct 6, the temperature range of 60° to 84° C., which is required during this phase and known in itself, might be adjusted, and the oxygen quantity wanted might be supplied, so that the necessary culture of bacteria can be controlled precisely and kept to an optimum value. The air quantity is controlled by the respective fan 15. The special design of the covering grill 5 as steel concrete ply-plates makes it possible to ventilate and to temper evenly the nutrient compost hilly beds 3 by means of air flowing through the air ducts 6. This takes place owing to the transverse slits within the covering grill 5 which are about 40 up to 60 cm long and have a clearance of 2 cm.

During phase 2, conditioning takes place by means of the air ducts 6 directly into the nutrient compost hilly beds 3 and by means of ventilating the room at known temperatures between 45° and 54° C. Pasteurization takes place at temperatures between 58° and 60° C. The period required for phase 2 covers about 5 days.

During phase 3, the nutrient compost hilly beds 3 will be cooled down to 24° C. by supplying tempered air by means of the air ducts 6 and by the systems which temper the room. Subsequently, the nutrient compost hilly beds 3 are transplanted whereby, in one operation, the substrate track is mixed with brood or with mushroom mycel. Subsequently, stripping off, grading and strengthening the hilly beds 3 will follow. During the growing-through period, the temperature of the substrate track will be kept even to 24° C. in the same way as just explained, by which air is supplied from below or also exhausted in order to keep optimum the air temperature. After the nutrient substrate has been grown through it within 8 up to 10 days, the nutrient substrate track should be covered with approx. a 6 cm layer of covering earth. Now growing of mycel into the covering earth layer will take place. During the next eight days and in the same way as the growing-through, ventilation and air conditioning will take place by means of circulating air at usual temperatures of 24° up to 28° C.

During phase 4, the fructification and harvest phase, the air blown through the substrate tracks is tempered by ventilation coming from air duct 6 to such an extent, that the substrate tracks are kept at 20° to 22° C. In one operation, the temperature in room 2 is reduced down to 16° to 18° C. in order to keep optimum the carbon dioxide contents of the air, or to keep above the substrate tracks the micro conditions necessary for the fructification stimulation.

As a result of composting, conditioning, bristling and cultivation, the nutrient substrate hilly beds 3 drop down from their height of about 2 m in the beginning to about 1 m during the harvest phase. This meets an ideal working dimension for manual as well as for machine harvest work. The height of the hilly beds 3 in the final phase depends on the structure of the compost used, on the capacity of the ventilation facilities, on the application possibilities of harvesters etc.

I claim:

1. Mushroom cultivation plant with nutrient compost arranged in air conditioned rooms, the nutrient compost being placed to form an extended hilly bed having a predetermined cross-section of substantially 2×2 m in the beginning of a cultivation cycle, comprising: an air duct arranged below the bed and covered with a covering grill having transverse slits for ventilating and tempering the compost by controlled air supply through said transverse slits; said air duct emitting tempered air and said transverse slits having a length of 40 to 60 cm and width of 2 cm; said covering grill having a cross-section which reduces from one end towards another end, a feeding air shaft extending from a fresh air supply end having at least one fan and at least one control damper and leading to said air duct, a vent running in said feeding air shaft for circulating air leading into said rooms, a circulation air damper connected with said control damper, an auxiliary air duct between two connected auxiliary control dampers being connected to an air supply shaft for interior air, said air supply shaft extending into an upper area of said rooms over substantially the whole length of the beds and having at least one fan and air distributor means.

2. Mushroom cultivation plant according to claim 1, wherein the cross-section of said air-duct reduces continually from an end located in vicinity of the vent.

3. Mushroom nursing plant according to claim 1, wherein the nutrient compost hilly bed extends essentially to a length of 30 m.

4. Mushroom plant according to claim 1, wherein said air-duct has an air intake and air outlet system, said air intake blowing air through the nutrient compost hilly bed, said air outlet system exhausting air from the nutrient compost hilly bed.

5. A plant according to claim 1, including heat-exchangers in the supply air shaft and feeding air shaft as well as one room exhaust air vent, said heat-exchangers being connected one with another for heat-recovery.

6. A plant according to claim 1 wherein said air-duct and said supply air shaft have heating, cooling and air humidifying means.

7. A plant according to claim 1, including temperature sensors in the supply air shaft and in the feeding air shaft control connected to said temperature sensors and a nominal value transmitter, said control means operating the control dampers dependent on air temperature.

8. A plant according to claim 7, including additional temperature sensors arranged in said air-duct for monitoring temperature and air humidity.

9. Process for preparing mushroom compost arranged in climatized rooms comprising the steps of: placing nutrient compost to form an extended hilly bed having a predetermined cross-section of substantially 2×2 m in the beginning of a cultivation cycle, ventilating and tempering the compost by controlled supply of air through transverse slits of a covering grill which covers an air duct arranged below the bed; said transverse slits having a length of 40 to 60 m and a width of 2 cm; turning and humidifying at the same location the nutrient compost in a first phase and composting within a temperature range of 60°–84° C., applying a temperature of 45°–54° C. in a second phase and pasteurizing at 58°–60° C., turning the compost in a third phase and cooling down to 24° C., providing the nutrient compost with a layer of earth in a fourth phase and at the same location, maintaining said layer for growing-through first at 24°–28° C., and then at 20°–22° C., and tempering the air about the nutrient compost to 16°–18° C. during a harvest phase.

* * * * *